United States Patent
Meng et al.

(10) Patent No.: US 12,176,571 B2
(45) Date of Patent: Dec. 24, 2024

(54) EXHAUST APPARATUS, BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventors: Wanqiu Meng, Ningde (CN); Qian Liu, Ningde (CN); Yonghuang Ye, Ningde (CN); Yulian Zheng, Ningde (CN); Longfei Xue, Ningde (CN); Xiaoxi Zhang, Ningde (CN); Peng Wang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 207 days.

(21) Appl. No.: 18/151,468

(22) Filed: Jan. 9, 2023

(65) Prior Publication Data
US 2023/0163410 A1 May 25, 2023

Related U.S. Application Data

(63) Continuation of application No. PCT/CN2021/121368, filed on Sep. 28, 2021.

(51) Int. Cl.
*H01M 50/15* (2021.01)
*H01M 50/30* (2021.01)

(52) U.S. Cl.
CPC ......... *H01M 50/394* (2021.01); *H01M 50/15* (2021.01); *H01M 2200/20* (2013.01); *H01M 2220/20* (2013.01)

(58) Field of Classification Search
None
See application file for complete search history.

(56) References Cited

FOREIGN PATENT DOCUMENTS

| | | |
|---|---|---|
| CN | 103824987 A | 5/2014 |
| CN | 105720222 A | 6/2016 |
| CN | 207818654 U | 9/2018 |
| CN | 208298910 U | 12/2018 |
| CN | 208507798 U | 2/2019 |
| CN | 109920953 A | 6/2019 |
| CN | 110021728 A | 7/2019 |

(Continued)

OTHER PUBLICATIONS

Machine Translation of CN208507798 (Year: 2019).*

(Continued)

*Primary Examiner* — Wyatt P McConnell
(74) *Attorney, Agent, or Firm* — Kilpatrick Townsend & Stockton LLP

(57) ABSTRACT

An exhaust apparatus, a battery cell, a battery, and an electric apparatus, are provided. The exhaust apparatus includes an exhaust body and an exhaust mechanism, where the exhaust mechanism includes a connection member and a ventilation member that are provided on the exhaust body, the connection member is configured to connect the exhaust body, the connection member is provided with a plurality of first through holes, the ventilation member covers the plurality of first through holes, and the ventilation member is configured to, when a pressure of gas inside a battery cell reaches a first threshold, exhaust the gas to the outside of the battery cell through the plurality of first through holes.

19 Claims, 10 Drawing Sheets

(56) References Cited

FOREIGN PATENT DOCUMENTS

| CN | 110429214 A | 11/2019 |
|---|---|---|
| CN | 209658282 U | 11/2019 |
| CN | 209896110 U | 1/2020 |
| CN | 114930636 A | 8/2022 |
| JP | H1186820 A | 3/1999 |
| JP | 2003323877 A | 11/2003 |
| WO | 1997030483 A1 | 8/1997 |
| WO | 1999036975 A1 | 7/1999 |

OTHER PUBLICATIONS

International Search Report received in International Application PCT/CN2021/121368, mailed May 5, 2022.
The extended European Search Report received in the corresponding European Application 21937196.0, mailed Jan. 9, 2024.
Notice of Reasons for Refusal received in the corresponding Japanese Application 2022-567227, mailed Nov. 28, 2023.

\* cited by examiner

EXHAUST APPARATUS, BATTERY CELL, BATTERY, AND ELECTRIC APPARATUS

CROSS-REFERENCE TO RELATED APPLICATIONS

This application is a continuation of International Application PCT/CN2021/121368, filed Sep. 28, 2021 and entitled "EXHAUST APPARATUS, BATTERY CELL, BATTERY, AND ELECTRIC APPARATUS", which is incorporated herein by reference in its entirety.

TECHNICAL FIELD

This application relates to the field of battery technologies, and in particular, to an exhaust apparatus, a battery cell, a battery, an electric apparatus, and a manufacturing method and manufacturing device of exhaust apparatus.

BACKGROUND

Batteries are widely used in electronic devices such as mobile phones, laptops, battery carts, electric vehicles, electric aircrafts, electric ships, electric toy cars, electric toy ships, electric toy aircrafts, and electric tools.

In the development of battery technologies, in addition to performance improvement of battery cells, safety is also an issue that needs to be considered. Therefore, how safety performance of battery cells is enhanced is an urgent issue that needs to be solved in battery technologies.

SUMMARY

Embodiments of this application provide an exhaust apparatus, a battery cell, a battery, an electric apparatus, a method, and a device. Such exhaust apparatus can meet internal gas exhaust requirements of battery cells, and can also ensure safety performance of battery cells.

According to a first aspect, an embodiment of this application provides an exhaust apparatus applied to a battery cell, including an exhaust body and an exhaust mechanism including a connection member and a ventilation member that are provided on the exhaust body, where the connection member is configured to connect the exhaust body, the connection member is provided with a plurality of first through holes, the ventilation member covers the plurality of first through holes, and the ventilation member is configured to, when a pressure of gas inside the battery cell reaches a first threshold, exhaust the gas to the outside of the battery cell through the plurality of first through holes; and the connection member includes a connection portion formed between two adjacent ones of the first through holes, and the connection portion is configured to attach to the ventilation member to limit deformation of the ventilation member.

In the foregoing technical solution, the exhaust apparatus includes an exhaust body and an exhaust mechanism, where the exhaust mechanism includes a connection member and a ventilation member that are provided on the exhaust body, the connection member is provided with a plurality of first through holes, the ventilation member covers the plurality of first through holes, and when a pressure of gas inside a battery cell reaches a first threshold, the gas is exhausted to the outside of the battery cell through the ventilation member and the plurality of first through holes, so as to achieve the purpose of exhausting the gas inside the battery cell. The connection member includes the connection portion formed between two adjacent ones of the first through holes, and therefore it can be attached to the ventilation member through the connection portion. When the gas inside the battery cell acts on the ventilation member in the process of exhaust to the outside of the battery cell through the ventilation member, the connection portion may provide the ventilation member with a counterforce against the gas pressure in the battery cell to reduce deformation of the ventilation member, improve the overall internal pressure resistance of the exhaust apparatus, and further enhance safety performance of the battery cell.

In some embodiments, the ventilation member is provided on a side of the connection member close to the inside of the battery cell, and the connection portion is configured to provide an anchorage force for the ventilation member when the ventilation member deforms towards the outside of the battery cell.

In the foregoing technical solution, the ventilation member is provided on the side of the connection member close to the inside of the battery cell. In the exhaust process, the connection member can provide an anchorage force for the ventilation member, ensuring sufficient exhaust area, avoiding deformation or displacement of the ventilation member due to excessive pressure in the battery cell, ensuring the integrity of the ventilation member, and enhance safety performance of the ventilation member. In addition, the ventilation member is provided on the side of the connection member close to the inside of the battery cell. Such position arrangement can increase the utilization of an exterior space of the end cover and facilitate the placement of other components.

In some embodiments, the plurality of first through holes have same shape and equal area.

In the foregoing technical solution, the plurality of first through holes having the same shape and equal area is beneficial for the gas to uniformly and quickly pass through the plurality of first through holes in the exhaust process. This enables the ventilation member to bear the same gas pressure as the corresponding component, avoiding deformation of the ventilation member under the action of gas due to the uneven distribution of the plurality of first through holes. Moreover, the plurality of first through holes may be processed by punching or milling. By making the plurality of first through holes have same shape and equal area, the same processing procedure may be used to process the first through holes, which can simplify the processing procedure, reduce the machining costs, and improve the forming efficiency.

In some embodiments, the plurality of first through holes are spaced apart from each other, and a minimum distance D between two adjacent ones of the first through holes and a thickness L of the ventilation member in an axial direction of the first through hole satisfy $1.2 \leq D/L \leq 5$.

In the foregoing technical solution, the minimum distance D between the two adjacent ones of the first through holes and the thickness L of the ventilation member in the axial direction of the first through hole satisfy $1.2 \leq D/L \leq 5$, which not only can ensure the mechanical strength of the connection portion and the attachment area between the connection portion and the ventilation member, but also can decrease a probability of deformation of the ventilation member under the action of the internal pressure of the battery cell.

In some embodiments, the first through hole is in one of a circular shape, an ellipse shape, a kidney shape, and a polygon shape.

In the foregoing technical solution, the first through hole being in one of a circular shape, an ellipse shape, a kidney shape, and a polygon shape not only can ensure the exhaust efficiency in the exhaust process, but also can make the first through holes have a regular geometric shape or an approximately regular geometric shape, which is beneficial to the processing and forming of the first through holes.

In some embodiments, the first through hole is circular, and a bore diameter d of the first through hole and a minimum distance D between two adjacent ones of the first through holes satisfy $0.1 \leq d/D \leq 4$.

If the bore diameter d of the first through hole is too small, the minimum distance D between two adjacent ones of the first through holes is too large, in other words, when $d/D<0.1$, under the condition that the ventilation area remains unchanged, an area occupied by the overall distribution of the first through holes is too large, which is not conducive to the assembly of other components; and if the bore diameter d of the first through hole is too large, the minimum distance D between the two adjacent ones of the first through holes is too small, in other words, when $d/D>4$, a jointing area between the connection portion and the ventilation member is too small, and correspondingly, connection strength therebetween is too small, which may lead to separation of the ventilation member from the connection portion, thereby affecting the performance of the ventilation member and making the ventilation member be prone to a risk of deformation when the internal pressure of the battery cell is too high. In the foregoing technical solution, the first through hole is circular, and the bore diameter d of the first through hole and the minimum distance D between the two adjacent ones of the first through holes satisfy $0.1 \leq d/D \leq 4$, which can make a ratio of the bore diameter d of the first through hole and the minimum distance D between the two adjacent ones of the first through holes be moderate, so as to avoid excessively large area being occupied by the plurality of first through holes caused by the excessively large or small ratio of the two, or avoid separation of the ventilation member from the connection portion caused by insufficient attachment strength therebetween.

In some embodiments, the minimum distance D between two adjacent ones of the first through holes satisfies $D \geq 0.5$ mm.

In the foregoing technical solution, the minimum distance D between two adjacent ones of the first through holes satisfies $D \geq 0.5$ mm, which can ensure the effective contact area of a matching portion between the connection portion and the ventilation member, and ensure the requirements for attachment strength between the connection portion and the ventilation member.

In some embodiments, in the axial direction of the first through hole, a sum S1 of orthographic projection areas of all of the first through holes and an orthographic projection area S2 of the ventilation member satisfy $S1/S2 \leq 0.8$.

In the foregoing technical solution, in the axial direction of the first through hole, the sum S1 of the orthographic projection areas of all of the first through holes and the orthographic projection area S2 of the ventilation member satisfy $S1/S2 \leq 0.8$, which can ensure the effective contact area of the matching portion between the connection portion and the ventilation member, enhance the attachment strength between the ventilation member and the ventilation member, decrease a probability of deformation of the ventilation member, and ensure integrity and reliability of the ventilation member.

In some embodiments, the exhaust body and the exhaust mechanism are provided separately, and the exhaust mechanism is connected to the exhaust body through the connection member.

In the foregoing technical solution, the exhaust body and the exhaust mechanism are separately formed, and the exhaust mechanism is connected to the exhaust body through the connection member, so that the exhaust body and the exhaust mechanism are independent components, which is convenient for processing and assembly. In addition, this separate-forming method enables the exhaust body and the exhaust mechanism to be processed and manufactured separately from different materials, such that an appropriate material and processing technology can be selected for the entire exhaust apparatus according to the structural characteristics and usage requirements of the exhaust mechanism.

In some embodiments, the exhaust body is provided with a first concave portion, and the first concave portion is configured to accommodate at least part of the exhaust mechanism.

In the foregoing technical solution, the first concave portion is configured to accommodate at least part of the exhaust mechanism, which can reduce the occupied space of the entire exhaust apparatus, and such arrangement of the first concave portion can enable positioning of the exhaust mechanism for installation and reduce assembly difficulty between the exhaust mechanism and the exhaust body.

In some embodiments, the connection member includes a body region and an exhaust region, where the body region is configured to connect the exhaust body, the exhaust region includes the connection portion and the plurality of first through holes, one part of the ventilation member is attached to the body region, and the other part of the ventilation member is attached to the connection portion of the exhaust region; and the exhaust body is provided at the bottom of the first concave portion with a shielding portion and a second through hole, the shielding portion is configured to shield at least part of the exhaust region, and the second through hole is configured to communicate with a space defined by the first concave portion.

In the foregoing technical solution, the connection member includes the body region and the exhaust region, and can be connected to the exhaust body through the body region to ensure the connection strength between the connection member and the exhaust body. The gas inside the battery cell can be exhausted through the exhaust region to ensure safety performance of the battery cell. Because one part of the ventilation member is attached to the body region and the other part of the ventilation member is attached to the exhaust region, to be specific, the ventilation member is attached not only to the connection portion but also to the body region, the attachment strength between the ventilation member and the connection member can be ensured, the risk of separation of the ventilation member from the connection member can be reduced. The shielding portion is configured to shield at least part of the exhaust region, and the shielding portion can prevent at least part of impurities from entering the plurality of first through holes, thereby avoiding influence on the ventilation member and ensuring performance of the ventilation member. The second through hole is configured to communicate with the space defined by the first concave portion, so that the gas inside the battery cell can be exhausted normally, so as to ensure safety performance of the battery cell.

In some embodiments, the shielding portion completely shields the exhaust region in the axial direction of the first through hole, and the second through hole is completely staggered from the exhaust region.

In the foregoing technical solution, in the axial direction of the first through hole, the shielding portion completely shields the exhaust region, and the second through hole is completely staggered from the exhaust region, which can not only ensure the internal gas exhaust requirements of the battery cell but also effectively protect the connection member and ventilation member through the shielding portion, decreasing a probability that the ventilation member is damaged or corroded by external impurities or internal electrolyte.

In some embodiments, the shielding portion is provided with a second concave portion, where the second concave portion is recessed from the bottom of the first concave portion in a direction leaving away from the ventilation member, and an avoidance space is formed between the bottom of the second concave portion and the exhaust mechanism to avoid the exhaust region.

In the foregoing technical solution, the shielding portion is provided with the second concave portion, and the avoidance space is formed between the bottom of the second concave portion and the exhaust mechanism, so that in the axial direction of the first through hole, when the orthographic projections of at least part of the first through holes are covered by the shielding portion, the shielding portion can be prevented from contacting the exhaust region of the connection member, thereby preventing the shielding portion from closing the first through holes covered by the shielding portion, ensuring the internal gas exhaust requirements of the battery cell and enhancing safety performance of the battery cell.

In some embodiments, the exhaust apparatus further includes a ventilation limiting member, where the ventilation limiting member is at least partially located in the second concave portion and is configured to limit deformation of the exhaust region.

In the foregoing technical solution, the exhaust apparatus further includes the ventilation limiting member, and the ventilation limiting member is at least partially located in the second concave portion to limit deformation of the exhaust region, thereby decreasing a probability of deformation of the ventilation member and enhancing safety performance of the exhaust apparatus.

In some embodiments, the ventilation limiting member is attached to the exhaust region and supported on the exhaust region.

In the foregoing technical solution, the ventilation limiting member is attached to the exhaust region and supported on the exhaust region, which can enhance air pressure resistance of the exhaust region, decrease a probability of deformation of the exhaust region, and further decrease a probability of deformation of a region to which the ventilation member is attached.

In some embodiments, the first concave portion is recessed from an outer surface of the exhaust body in a direction approaching towards the inside of the battery cell, the shielding portion is located on a side of the exhaust mechanism close to the inside of the battery cell, and the second through hole is configured to communicate an interior space of the battery cell with the first concave portion.

In the foregoing technical solution, the first concave portion is recessed from the outer surface of the exhaust body in the direction approaching towards the inside of the battery cell, the shielding portion is located on the side of the exhaust mechanism close to the inside of the battery cell, and the second through hole is configured to communicate the interior space of the battery cell with the first concave portion, which is convenient for installation and positioning of the exhaust mechanism.

In some embodiments, the first concave portion is recessed from an inner surface of the exhaust body in a direction leaving away from the inside of the battery cell, the shielding portion is located on a side of the exhaust mechanism far away from the inside of the battery cell, and the second through hole is configured to communicate an exterior space of the battery cell with the first concave portion.

In the foregoing technical solution, the first concave portion is recessed from the inner surface of the exhaust body in the direction leaving away from the inside of the battery cell, the shielding portion is located on the side of the exhaust mechanism far away from the inside of the battery cell, and the second through hole is configured to communicate the exterior space of the battery cell with the first concave portion, so that the gas inside the battery cell can flow through the second through hole and the first through holes in sequence and be exhausted through the ventilation mechanism. A position of the shielding portion can effectively prevent external impurities from entering the first through holes, thereby reducing the risk of damage to the ventilation member.

In some embodiments, the ventilation member and the connection member are integrally connected by chemical bonding.

In the foregoing technical solution, the ventilation member and the connection member are integrally connected by chemical bonding, such connection between the two components by chemical bonding makes the connection between the ventilation member and the connection member more firmly, ensures the connection strength of the two, gives less influence on performance of the ventilation member, and can guarantee performance of the ventilation member.

In some embodiments, an accommodating chamber is formed inside the exhaust body, the exhaust body has a plurality of walls defining the accommodating chamber, and the exhaust mechanism is provided on at least one of the walls.

In the foregoing technical solution, the accommodating chamber is formed inside the exhaust body, the exhaust body has the plurality of walls defining the accommodating chamber, and the exhaust mechanism is provided on at least one of the walls, in other words, the exhaust apparatus may be a shell structure capable of accommodating an electrode assembly, and the exhaust apparatus integrates an accommodating function and an exhaust function.

In some embodiments, the exhaust body is an end cover of the battery cell.

In the foregoing technical solution, the exhaust body is the end cover of the battery cell, in other words, the exhaust mechanism may be the end cover disposed on the battery cell.

In some embodiments, the exhaust apparatus further includes an insulating member, where the insulating member is located on a side of the exhaust body close to the inside of the battery cell, the insulating member is provided with a third through hole, and the third through hole is configured to communicate the interior space of the battery cell with the first through holes.

In the foregoing technical solution, provision of the insulating member can avoid short circuit caused by contact between the electrode assembly and the end cover metal, and the third through hole provided on the insulating member can communicate the interior space of the battery cell with the first through holes, ensuring the internal gas exhaust requirements of the battery cell.

In some embodiments, in the axial direction of the first through hole, the third through hole is completely staggered from the first through hole.

In the foregoing technical solution, the insulating member can block liquid or impurity particles, ensuring the performance of the ventilation member, and the foregoing arrangement can also prevent the gas inside the battery cell from directly acting on the first through holes via the third through hole, reducing impact force on the first through holes, decreasing a probability of deformation of the ventilation member, and further ensuring safety performance of the battery cell.

According to a second aspect, an embodiment of this application provides a battery cell, including the exhaust apparatus according to any one of the embodiments of the first aspect.

According to a third aspect, an embodiment of this application provides a battery, including: the battery cell according to any one of the embodiments of the second aspect; and a box, configured to accommodate the battery cell.

According to a fourth aspect, an embodiment of this application provides an electric apparatus, including the battery according to any one of the embodiments of the third aspect, where the battery is configured to supply electric energy.

According to a fifth aspect, an embodiment of this application provides a manufacturing method of exhaust apparatus, where the method includes: providing an exhaust body; and providing an exhaust mechanism, and connecting the exhaust mechanism to the exhaust body, where the exhaust mechanism includes a connection member and a ventilation member, the connection member is configured to connect the exhaust body, the connection member is provided with a plurality of first through holes, the ventilation member covers the plurality of first through holes, and the ventilation member is configured to, when a pressure of gas inside the battery cell reaches a first threshold, exhaust the gas to the outside of the battery cell through the plurality of first through holes; and the connection member includes a connection portion formed between two adjacent ones of the first through holes, and the connection portion is configured to attach to the ventilation member to limit deformation of the ventilation member.

According to a sixth aspect, an embodiment of this application provides a manufacturing device of exhaust apparatus, where the device includes: a providing apparatus, configured to provide an exhaust body; and an assembly apparatus, configured to provide an exhaust mechanism and connect the exhaust mechanism to the exhaust body, where the exhaust mechanism includes a connection member and a ventilation member, the connection member is configured to connect the exhaust body, the connection member is provided with a plurality of first through holes, the ventilation member covers the plurality of first through holes, and the ventilation member is configured to, when a pressure of gas inside the battery cell reaches a first threshold, exhaust the gas to the outside of the battery cell through the plurality of first through holes; and the connection member includes a connection portion formed between two adjacent ones of the first through holes, and the connection portion is configured to attach to the ventilation member to limit deformation of the ventilation member.

The foregoing descriptions are merely an overview of the technical solutions of this application. To understand the technical means of this application more clearly, the technical solutions can be implemented according to the contents of this specification, and to make the preceding and other purposes, features, and advantages of this application more clear and easy to understand, the following specific embodiments of this application are presented.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and a person of ordinary skill in the art may still derive other drawings from the accompanying drawings without creative efforts.

Figure 1:
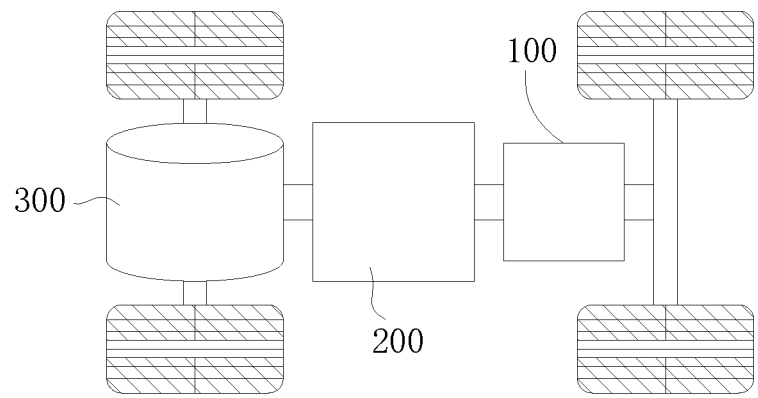
FIG. 1 is a schematic structural diagram of a vehicle according to an embodiment of this application.

Reference signs in the specific embodiments are described as follows:

1000. vehicle;
100. battery; 200. controller; 300. motor;
10. box; 11. first portion; 12. second portion;
20. battery cell;
21. housing;
22. electrode assembly; 221. positive electrode tab; 222. negative electrode tab;
23. end cover; 231. positive electrode terminal; 232. negative electrode terminal;
24. exhaust apparatus;
241. exhaust body; 2411. first concave portion; 2412. shielding portion; 2413. second through hole; 2414. second concave portion; 2415. avoidance space; 2416. accommodating chamber; 2417a. bottom wall; 2417b. side wall;
242. exhaust mechanism; 2421. connection member; 2421a. first through hole; 2421b. connection portion; 24211. body region; 24212. exhaust region; 2422. ventilation member;
243. ventilation limiting member;
244. insulating member; 2441. third through hole;
2100. providing apparatus; 2200. assembly apparatus; X. axial direction.

In the accompanying drawings, the same reference signs represent the same components, and the figures are not drawn to scale.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

In this application, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skills in the art can understand specific meanings of these terms in this application as appropriate to specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

In the embodiments of this application, the same reference signs denote the same components. For brevity, in different embodiments, detailed descriptions of the same components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matters from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive electrode tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative electrode tab. The negative electrode current collector may be made of copper, and the negative electrode active substance may be carbon, silicon, or the like. To allow a large current to pass through without any fusing, multiple positive electrode tabs are provided and stacked together, and multiple negative electrode tabs are provided and stacked together. The separator may be made of PP (polypropylene, polypropylene), PE (polyethylene, polyethylene), or the like. In addition, the electrode assembly may be a winding structure or a laminated structure, but the embodiments of this application are not limited thereto.

For the development of battery technology, many design factors need to be considered, for example, performance parameters such as energy density, cycle life, discharge capacity, and charge and discharge rate, as well as safety of the battery.

In the battery cell, after many charge and discharge cycles, there are side reactions, and gas is continuously generated, such that there is a specific air pressure in the battery cell. As the air pressure increases, the gas between the electrode plates cannot be exhausted in due course, which affects intercalation and deintercalation of lithium ions, and then leads to the risk of lithium precipitation. To ensure safety performance of the battery cell, an exhaust apparatus is typically provided in the battery cell, and the gas generated inside the battery cell is exhausted through the exhaust apparatus to ensure safety performance of the battery cell.

The inventors found that even if an exhaust apparatus is provided in the battery cell, the risks of fire and explosion of the battery cell still occur. The inventors found through further studies that in an existing exhaust apparatus, a large through hole is generally provided on the exhaust body, and a ventilation member covers the through hole. When an air pressure in the battery cell reaches a preset threshold, the gas is exhausted from the battery cell through the ventilation member. The gas acts on the ventilation member in the exhaust process, which makes the ventilation member easy to deform, accelerates the aging of the ventilation member, and brings a safety risk to the battery cell.

In view of this, an embodiment of this application provides an exhaust apparatus, in which a connection member and a ventilation member are provided on an exhaust body. The connection member is configured to connect the exhaust body, and the connection member is provided with a plurality of first through holes. The ventilation member covers the plurality of first through holes, and the ventilation member is configured to, when a pressure of gas inside a battery cell reaches a first threshold, exhaust the gas to the outside of the battery cell through the plurality of first through holes. The connection member includes a connection portion formed between two adjacent ones of the first through holes, and the connection portion is configured to attach to the ventilation member to limit deformation of the ventilation member.

If such exhaust apparatus is applied to the battery cell, and when a pressure of gas inside a battery cell reaches a first threshold, the ventilation member exhausts the gas to the outside of the battery cell through the plurality of first through holes, so as to achieve the purpose of exhausting the gas inside the battery cell. The connection member includes the connection portion formed between two adjacent ones of the first through holes, and therefore it can be attached to the ventilation member through the connection portion. When the gas inside the battery cell is relatively high and acts on the ventilation member, the connection portion can provide the ventilation member with a counterforce against the pressure in the battery cell to reduce deformation of the ventilation member, improve the overall internal pressure resistance of the exhaust apparatus, decrease an aging rate of the ventilation member, and further enhance safety performance of the battery cell.

The pressure relief apparatus described in the embodiments of this application is applicable to battery cells, batteries, and electric apparatuses and devices using a battery.

The electric apparatus and device may be vehicles, mobile phones, portable devices, notebook computers, ships, spacecrafts, electric toys, electric tools, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, an electric toy airplane, and the like. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric device.

For ease of description, the electric apparatus being a vehicle is used as example for description of the following embodiments.

Referring to FIG. 1, FIG. 1 is a schematic structural diagram of a vehicle 1000 according to some embodiments of this application. The vehicle 1000 is provided with a battery 100 inside, where the battery 100 may be disposed at the bottom, front or rear of the vehicle 1000. The battery 100 may be configured to supply power to the vehicle 1000. For example, the battery 100 may be used as an operational power source for the vehicle 1000.

The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
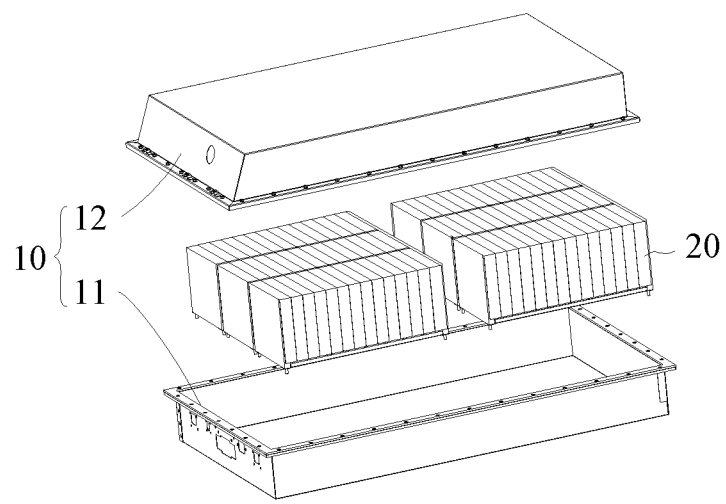
FIG. 2 is a schematic structural diagram of a battery according to some embodiments of this application.

Referring to FIG. 2, FIG. 2 is a schematic structural diagram of a battery 100 according to some embodiments of this application. The battery 100 includes a box 10 and a battery cell 20, where the box 10 is configured to accommodate the battery cell 20.

The box 10 is an element for accommodating the battery cell 20, providing an accommodating space for the battery cell 20. The box 10 may be a variety of structures. In some embodiments, the box 10 may include a first portion 11 and a second portion 12. The first portion 11 and the second portion 12 fit together to jointly define a space for accommodating the battery cell 20. The first portion 11 and the second portion 12 may have a variety of shapes, for example, cuboid, cylinder, or the like. The first portion 11 may be a hollow structure with one side open, and the second portion 12 may also be a hollow structure with one side open, where the open side of the second portion 12 is engaged with the open side of the first portion 11 so as to form a box 10 having an accommodating space. Alternatively, the first portion 11 may be a hollow structure with one side open, and the second portion 12 may be a plate structure, where the second portion 12 is engaged with the open side of the first portion 11 so as to form a box 10 having an accommodating space. The first portion 11 and the second portion 12 may be sealed by a sealing element, and the sealing element may be a sealing ring, a sealing adhesive, or the like.

In the battery 100, one or a plurality of battery cells 20 may be provided. If a plurality of battery cells 20 are provided, the plurality of battery cells 20 may be connected in series, in parallel, or in series-parallel, where being connected in series-parallel means a combination of series and parallel connections of the plurality of battery cells 20. Alternatively, the plurality of battery cells 20 may be connected in series, in parallel, or in series-parallel first to form a battery module first, and then a plurality of battery modules are connected in series, in parallel, or in series-parallel to form an entirety which is accommodated in the box 10. It is also possible that all the battery cells 20 are directly connected in series, in parallel, or in series-parallel to form an entirety which is then accommodated in the box 10.

Figure 3:
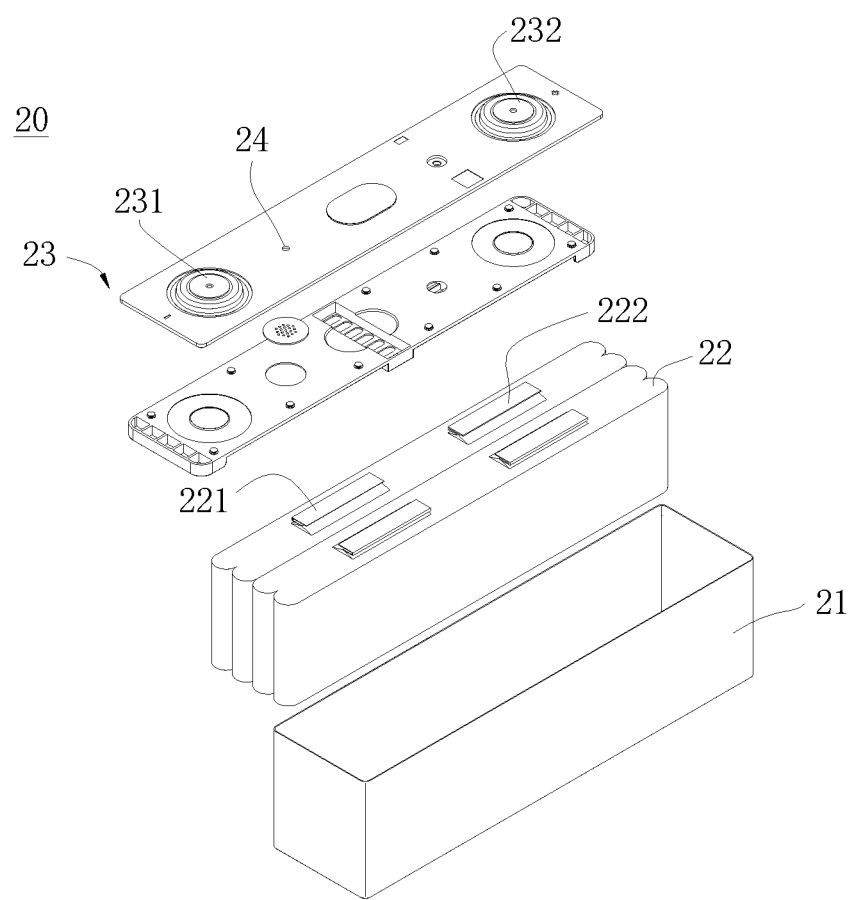
FIG. 3 is an exploded view of a battery cell according to some embodiments of this application.

Referring to FIG. 3, FIG. 3 is an exploded view of a battery cell 20 according to some embodiments of this application. The battery cell 20 includes an end cover 23, an electrode assembly 22, a housing 21, and an exhaust apparatus 24.

The housing 21 is a component for accommodating the electrode assembly 22, and the housing 21 may be a hollow structure with an opening formed at one end. The housing 21 may be in various shapes, such as cylinder and cuboid. The housing 21 may be made of various materials such as copper, iron, aluminum, steel, and aluminum alloy.

The electrode assembly 22 in the housing 21 may be provided in one or in plurality. For example, as shown in FIG. 3, there are a plurality of electrode assemblies 22, and the plurality of electrode assemblies 22 are arranged in a stacking manner.

The electrode assembly 22 is a component of the battery cell 20 in which electrochemical reactions occur. The electrode assembly 22 includes a negative electrode plate, a positive electrode plate, and a separator. The electrode assembly 22 may be a winding structure formed by winding the positive electrode plate, the separator, and the negative electrode plate, or may be a stacked structure formed by stacking the positive electrode plate, the separator, and the negative electrode plate.

The positive electrode plate may include a positive electrode current collector and a positive electrode active substance layer coated on each of two opposite sides of the positive electrode current collector. The negative electrode plate may include a negative electrode current collector and a negative electrode active substance layer coated on each of two opposite sides of the negative electrode current collector. The electrode assembly 22 has a positive electrode tab 221 and a negative electrode tab 222. The positive electrode tab 221 may be part of the positive electrode plate uncoated with the positive electrode active material layer, and the negative electrode tab 222 may be part of the negative electrode plate uncoated with the negative electrode active material layer.

The end cover 23 is a component that covers the opening of the housing 21 to isolate the internal environment of the battery cell 20 from the external environment. The end cover 23 covers the opening of the housing 21, and the end cover 23 and the housing 21 together define a sealed space for accommodating the electrode assembly 22, the electrolyte, and other components. A shape of the end cover 23 may match a shape of the housing 21. For example, the housing 21 is a cuboid structure, and the end cover 23 is a rectangular plate structure that matches the housing 21. For another example, the housing 21 is a cylinder structure, and the end cover 23 is a circular plate structure that matches the housing 21. The end cover 23 may also be made of various materials such as copper, iron, aluminum, steel, and aluminum alloy. The end cover 23 and the housing 21 may be made of a same material or different materials.

An electrode terminal may be provided on the end cover 23, and the electrode terminal is configured to electrically connect to the electrode assembly 22 so as to output electrical energy of the battery cell 20. The electrode terminal may include a positive electrode terminal 231 and a negative electrode terminal 232. The positive electrode terminal 231 is configured to electrically connect to the positive electrode tab 221. and the negative electrode terminal 232 is configured to electrically connect to the negative electrode tab 222. The positive electrode terminal 231 and the positive electrode tab 221 may be directly connected or indirectly connected, and the negative electrode terminal 232 and the negative electrode tab 222 may be directly connected or indirectly connected.

The exhaust apparatus 24 is a component that exhausts the gas inside the battery cell 20, and when a pressure of gas inside the battery cell 20 reaches a first threshold, the exhaust apparatus 24 exhausts the gas inside the battery cell 20. A specific structure of the exhaust apparatus 24 is described in detail below with reference to the accompanying drawings.

Figure 4:
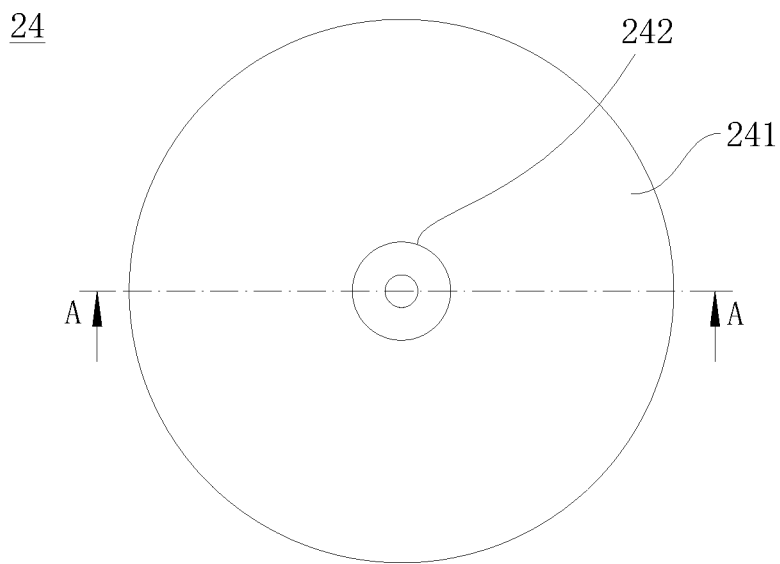
FIG. 4 is a top view of an exhaust apparatus according to some embodiments of this application.
Figure 5:
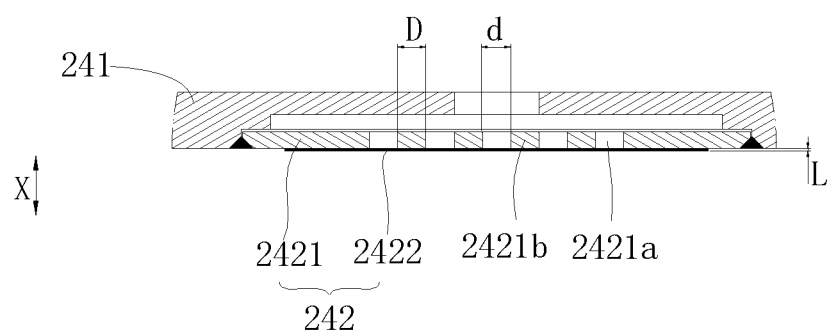
FIG. 5 is a cross-sectional view along direction A-A in FIG. 4.
Figure 6:
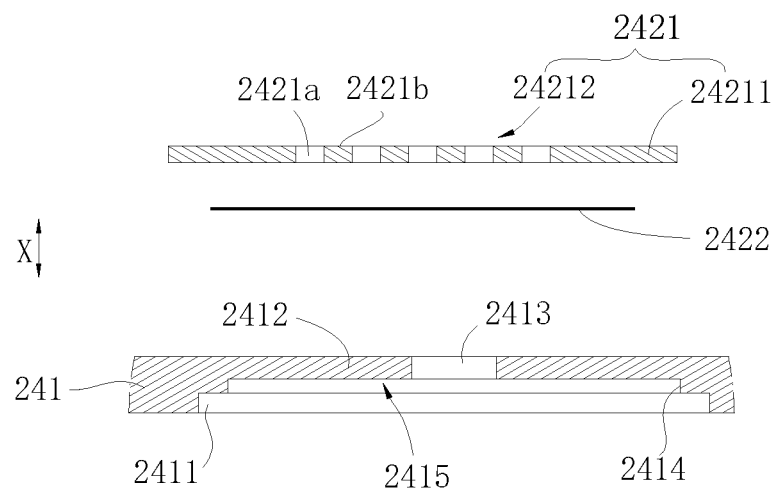
FIG. 6 is an exploded view of an exhaust apparatus according to some embodiments of this application.
Figure 7:
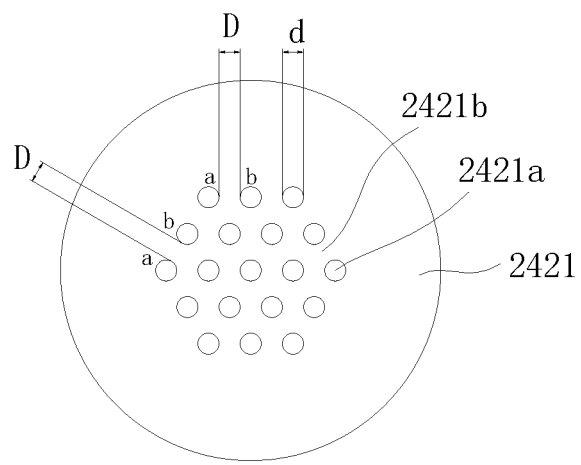
FIG. 7 is a top view of a connection member of an exhaust apparatus according to some embodiments of this application.

Referring to FIG. 4 to FIG. 6, FIG. 4 is a top view of an exhaust apparatus 24 according to some embodiments of this application, FIG. 5 is a cross-sectional along direction A-A in FIG. 4, and FIG. 6 is an exploded view of the exhaust apparatus 24 according to some embodiments of this application. The exhaust apparatus 24 provided in this embodiment of this application is applied to the battery cell 20, and the exhaust apparatus 24 includes an exhaust body 241 and an exhaust mechanism 242. The exhaust mechanism 242 includes a connection member 2421 and a ventilation member 2422 that are provided on the exhaust body 241, the connection member 2421 is configured to connect the exhaust body 241, the connection member 2421 is provided with a plurality of first through holes 2421a, the ventilation member 2422 covers the plurality of first through holes 2421a, and the ventilation member 2422 is configured to, when a pressure of gas inside the battery cell 20 reaches a first threshold, exhaust the gas to the outside of the battery cell 20 through the plurality of first through holes 2421a. The connection member 2421 includes a connection portion 2421b formed between two adjacent ones of the first through holes 2421a, and the connection portion 2421b is configured to attach to the ventilation member 2422 to limit deformation of the ventilation member 2422.

The exhaust body 241 may be a component mounted on the end cover 23, for example, the exhaust apparatus 24 is a plate structure mounted on the end cover 23. The entire exhaust body 241 may also be the end cover 23 for covering the electrode assembly 22. For example, the end cover 23 is the exhaust body 241. The exhaust body 241 may also be the housing 21 for accommodating the electrode assembly 22. For example, the housing 21 is the exhaust body 241, and the connection member 2421 of the exhaust mechanism 242 may be connected to the housing 21.

The connection member 2421 and the exhaust body 241 may be of an integrated structure, or certainly may be of a split structure. When the split structure is used, the two may be fixedly connected by welding or the like.

The number of first through holes 2421a provided in the connection member 2421 may be two, three, or more. The specific number is not limited in this application.

The first through hole 2421a may be in a regular geometric shape, such as a circle, an ellipse, and a regular polygon. Certainly, the first through hole 2421a may alternatively be in an irregular geometric shape. The specific shape is not limited in this application, provided that internal gas exhaust requirements of the battery cell 20 can be met.

All of the first through holes 2421a may have a same shape. For example, the plurality of first through holes 2421a may all be in a circular shape, an ellipse shape, or a kidney shape. Certainly, all of the first through holes 2421a may be in different shapes, or at least part of the first through holes 2421a may be in different shapes. For example, part of the first through holes 2421a may be in a circular shape, and part of the first through holes 2421a may be in an ellipse shape, a kidney shape, or a polygon shape.

The first through hole 2421a may be formed in various ways, such as punching and milling, which is not particularly limited in the embodiments of this application.

The distribution pattern of the plurality of first through holes 2421a on the connection member 2421 is not specifically limited. For example, the plurality of first through holes 2421a may be distributed in rows and columns or in an array, or may be distributed in sequence along a circular track, or certainly may be distributed in sequence along a linear track or a curved track.

Hole walls of two adjacent ones of the first through holes 2421a are at least partially spaced apart, and the connection portion 2421b is a region where the connection member 2421 is located between two adjacent ones of the first through holes 2421a. In any direction perpendicular to the axial direction of the first through hole 2421a, the connection portion 2421b may be formed between every two adjacent ones of the first through holes 2421a.

The connection portion 2421b is attached to the ventilation member 2422, and the ventilation member 2422 may contact and abut against the connection portion 2421b. The ventilation member 2422 and the connection portion 2421b may be connected to each other by means of bonding or chemical bonding. Deformation of the ventilation member 2422 may be caused by bulging at least partially in a direction leaving away from the electrode assembly 22.

The ventilation member 2422 may be provided on a side of the connection member 2421 close to the inside of the battery cell 20. In this case, the connection portion 2421b is configured to provide an anchorage force for the ventilation member 2422 when the ventilation member 2422 deforms towards the outside of the battery cell 20. Certainly, the ventilation member 2422 may alternatively be provided on a side of the connection member 2421 far away from the inside of the battery cell 20. In this case, the connection portion 2421b is configured to provide pulling stress for the ventilation member 2422 when the ventilation member 2422 deforms towards the outside of the battery cell 20.

The ventilation member 2422 covers the plurality of first through holes 2421a. Specifically, an orthographic projection of the ventilation member 2422 can cover orthographic projections of all of the first through holes 2421a in the axial direction X of the first through hole 2421a. The ventilation member 2422 is configured to exhaust the gas to the outside of the battery cell 20 through the plurality of first through holes 2421a when the gas pressure in the battery cell 20 reaches the first threshold.

The ventilation member 2422 has a ventilation function, and may be made of PP (polypropylen, polypropylene), PE (polyethylene, polyethylene), PU (polyurethane, polyurethane), or the like. The gas inside the battery cell 20 needs to pass through the ventilation member 2422 when it is exhausted. The ventilation member 2422 can allow the gas inside the battery cell 20 to flow to the outside, and can block water vapor and the like outside the battery cell 20 from entering the inside of the battery cell 20.

In the foregoing technical solution, the exhaust mechanism 242 includes the exhaust body 241 and the exhaust mechanism 242 provided on the exhaust body 241. The exhaust mechanism 242 includes the connection member 2421 and the ventilation member 2422, and the connection member 2421 is provided with the plurality of first through holes 2421a. The ventilation member 2422 covers the plurality of first through holes 2421a. When the pressure of the gas in the battery cell 20 reaches the first threshold, the gas is exhausted to the outside of the battery cell 20 through the ventilation member 2422 and the plurality of first through holes 2421a, so as to achieve the purpose of exhausting the gas inside the battery cell 20. The connection member 2421 includes the connection portion 2421b formed between two adjacent ones of the first through holes 2421a, and therefore it can be attached to the ventilation member 2422 through the connection portion 2421b. When the gas inside the battery cell 20 acts on the ventilation member 2422 in the process of exhaust to the outside of the battery cell 20 through the ventilation member 2422, the connection portion 2421b can provide the ventilation member 2422 with a counterforce against the pressure in the battery cell 20 to reduce deformation of the ventilation member 2422, improve the overall internal pressure resistance of the exhaust apparatus 24, and further enhance safety performance of the battery cell 20.

In some embodiments, the ventilation member 2422 is provided on the side of the connection member 2421 close to the inside of the battery cell 20, and the connection portion 2421b is configured to provide an anchorage force for the ventilation member 2422 when the ventilation member 2422 deforms towards the outside of the battery cell 20.

The side of the connection member 2421 close to the inside of the battery cell 20 may be a side of the connection member 2421 close to the inside of the battery cell 20 in the axial direction X of the first through hole 2421a. When the ventilation member 2422 deforms towards the outside of the battery cell 20, the connection portion 2421b can provide the anchorage force for the ventilation member 2422 in the axial direction X of the first through hole 2421a to limit deformation of the ventilation member 2422.

The ventilation member 2422 is provided on the side of the connection member 2421 close to the inside of the battery cell 20. In the exhaust process, the connection member 2421 can provide the anchorage force for the ventilation member 2422, ensuring sufficient exhaust area, avoiding deformation or displacement of the ventilation member 2422 due to excessive pressure in the battery cell 20, ensuring the integrity of the ventilation member 2422, and enhancing safety performance of the ventilation member 2422. In addition, the ventilation member 2422 is provided on the side of the connection member 2421 close to the inside of the battery cell 20. Such position arrangement can increase the utilization of an exterior space of the end cover 23, which is convenient for marking or implementing more functions.

In some embodiments, the plurality of first through holes 2421a have same shape and equal area. The plurality of first through holes 2421a may have the same shapes, for example, the plurality of first through holes 2421a may all be circular holes. Certainly, the plurality of first through holes 2421a may all be elliptical holes or polygonal holes, and optionally may be regular polygonal holes. The plurality of first through holes 2421a having the equal area means that any two of the first through holes 2421a have equal area. For example, when the plurality of first through holes 2421a are all circular holes, any two of the first through holes 2421a have equal diameter, and when all of the plurality of first through holes 2421a are elliptical holes, any two of the first through holes 2421a have equal major axes and equal minor axes.

The plurality of first through holes 2421a have same shape and equal area, which is beneficial for the gas to uniformly and quickly pass through the plurality of first through holes 2421a in the exhaust process. This enables the ventilation member 2422 to bear the same gas pressure as a corresponding component, avoiding deformation of the ventilation member 2422 under the action of gas due to the uneven distribution of the gas flowing through the plurality of first through holes 2421a. Moreover, the plurality of first through holes 2421a may be processed by punching or milling. By making the plurality of first through holes 2421a have same shape and equal area, the same processing procedure may be used to process the first through holes 2421a, which can simplify the processing procedure, reduce the machining costs, and improve the forming efficiency.

Still referring to FIG. 4 to FIG. 7, FIG. 7 is a top view of the connection member 2421 of the exhaust apparatus 24 according to some embodiments of this application. In some embodiments, the plurality of first through holes 2421a are spaced apart from each other, and a minimum distance D between two adjacent ones of the first through holes 2421a and a thickness L of the ventilation member 2422 in an axial direction X of the first through hole 2421a satisfy $1.2 \leq D/L \leq 5$.

The plurality of first through holes 2421a are spaced apart from each other, so that hole walls of two adjacent ones of the first through holes 2421a are spaced apart from each other. The minimum distance D between two adjacent ones of the first through holes 2421a may be a minimum distance between orthographic projections of the hole walls of the two adjacent ones of the first through holes 2421a in the axial direction X of the first through hole 2421a. For example, a point a may be taken from an orthographic projection of one of the two adjacent ones of the first through holes 2421a, and a point b may be taken from an orthographic projection of the other one. In line segments formed by connecting a and b, a line segment with the shortest length is the minimum distance D between the two adjacent ones of the first through holes 2421a.

Through the foregoing arrangement, mechanical strength of the connection portion 2421b and an attachment area between the connection portion 2421b and the ventilation member 2422 can be ensured, and a probability of deformation of the ventilation member 2422 under the action of the pressure in the battery cell 20 is decreased.

In some embodiments, the first through hole 2421a is in one of a circular shape, an ellipse shape, a kidney shape, and a polygon shape.

The shape of the first through hole 2421a may be a shape of an orthographic projection of the first through hole 2421a in the axial direction X thereof, and may be in one of a circular shape, an ellipse shape, a kidney shape, and a polygon shape. The first through holes 2421a may all be in one of a circular shape, an ellipse shape, a kidney shape, and a polygon shape.

Through the foregoing arrangement, in the exhaust process, the battery cell 20 can not only ensure exhaust efficiency, but also make the first through holes 2421a have a regular geometric shape or an approximately regular geometric shape, which is beneficial to the processing and forming of the first through holes 2421a.

In some embodiments, the first through holes 2421a are circular, and a bore diameter d of the first through hole 2421a and a minimum distance D between two adjacent ones of the first through holes 2421a satisfy $0.1 \leq d/D \leq 4$.

If the bore diameter d of the first through hole 2421a is too small, the minimum distance D between two adjacent ones of the first through holes 2421a is too large, in other words, when $d/D<0.1$, under the condition that the ventilation area remains unchanged, an area occupied by the overall distribution of the first through holes 2421a is too large, which is not conducive to the assembly of other components; and if the bore diameter d of the first through hole 2421a is too large, the minimum distance D between the two adjacent ones of the first through holes 2421a is too small, in other words, when $d/D>4$, a jointing area between the connection portion 2421b and the ventilation member 2422 is too small, and correspondingly, connection strength therebetween is too small, which may lead to separation of the ventilation member 2422 from the connection portion 2421b, thereby affecting the performance of the ventilation member 2422 and making the ventilation member 2422 be prone to a risk of deformation when the internal pressure of the battery cell 20 is too high. In the foregoing technical solution, the first through hole 2421a is circular, and the bore diameter d of the first through hole 2421a and the minimum distance D between the two adjacent ones of the first through holes 2421a satisfy $0.1 \leq d/D \leq 4$, which can make a ratio of the bore diameter d of the first through hole 2421a to the minimum distance D between the two adjacent ones of the first through holes 2421a be moderate, so as to avoid excessively large area being occupied by the plurality of first through holes 2421a caused by the excessively large or small ratio of the two, or avoid separation of the ventilation member from the connection portion caused by insufficient attachment strength therebetween.

In some embodiments, the minimum distance D between two adjacent ones of the first through holes 2421a satisfies $D \geq 0.5$ mm.

If the distance between two adjacent ones of the first through holes 2421a is too small, the first through holes 2421a may be deformed or even the connection portion 2421b between the two adjacent ones of the first through holes 2421a may be broken, resulting in deformation and even failure of the ventilation member 2422. The foregoing arrangement can ensure a larger effective contact area of a matching portion between the connection portion 2421b and the ventilation member 2422, ensure the attachment strength requirements of the connection portion 2421b and the ventilation member 2422, and avoid fracture and failure of the connection portion 2421b caused by a too small distance between the two adjacent ones of the first through holes 2421a.

In some embodiments, in the axial direction of the first through hole 2421a, a sum S1 of orthographic projection areas of all of the first through holes 2421a and an orthographic projection area S2 of the ventilation member 2422 satisfy $S1/S2 \leq 0.8$.

The area of the orthographic projection of each of the first through holes 2421a in its own axial direction X is an area enclosed by an orthographic projection contour of the hole wall of the first through hole 2421a in the axial direction X. For example, when the first through hole 2421a is a circular hole, the orthographic projection of the first through hole 2421a in its own axial direction X is circular, and the area of the orthographic projection of the first through hole 2421a is an area of the circular inner region. When the orthographic projection of the first through hole 2421a in its own axial direction X is polygonal, the area of the orthographic projection of the first through hole 2421a is an area of the inner region of the polygon.

When the number of the first through holes 2421a is 8, the sum S1 of the areas of the orthographic projections of all of the first through holes 2421a is equal to a value obtained by adding areas of orthographic projections of the 8 first through holes 2421a in the axial direction X of the first through hole 2421a. When the number of the first through holes 2421a is 16, the sum S1 of the areas of the orthographic projections of all of the first through holes 2421a is equal to a value obtained by adding areas of orthographic projections of the 16 first through holes 2421a in the axial direction X of the first through hole 2421a.

In the axial direction X of the first through hole 2421a, the area S2 of the orthographic projection of the ventilation member 2422 is greater than the sum S1 of the areas of the orthographic projections of all of the first through holes 2421a.

The foregoing arrangement can ensure the effective contact area of the matching portion between the connection portion 2421b and the ventilation member 2422, enhance the attachment strength between the ventilation member 2422 and the connection portion 2421b, decrease a probability of deformation of the ventilation member 2422, and ensure integrity and reliability of the ventilation member 2422.

Still referring to FIG. 4 to FIG. 7, in some embodiments, the exhaust body 241 and the exhaust mechanism 242 are provided separately, and the exhaust mechanism 242 is connected to the exhaust body 241 through the connection member 2421.

The exhaust body 241 and the exhaust mechanism 242 are provided separately, that is, the exhaust body 241 and the exhaust mechanism 242 may be two independent components before they are assembled, and are produced and processed separately, and when the exhaust body 241 and the exhaust mechanism 242 are assembled together, the exhaust mechanism 242 is connected to the connection member 2421 through the exhaust body 241.

In the foregoing arrangement, the exhaust body 241 and the exhaust mechanism 242 are independent components, which is convenient for processing and assembling. In addition, this separate-forming method enables the exhaust body 241 and the exhaust mechanism 242 to be processed and manufactured separately from different materials, such that an appropriate material and processing technology can be selected for the entire exhaust apparatus according to the structural characteristics and usage requirements of the exhaust mechanism 242.

In some embodiments, the exhaust body 241 is provided with a first concave portion 2411, and the first concave portion 2411 is configured to accommodate at least part of the exhaust mechanism 242.

The first concave portion 2411 is formed by removing part of the material on the exhaust body 241. In the axial direction X of the first through hole 2421a, a thickness of a bottom wall of the first concave portion 2411 is smaller than a thickness of a corresponding another region of the exhaust body 241. When the exhaust apparatus 24 is applied to the battery cell 20, the first concave portion 2411 may be provided close to the electrode assembly 22, or certainly may be provided far away from the electrode assembly 22.

In the axial direction X of the first through hole 2421a, the orthographic projection of the first concave portion 2411 may be in a circular shape, an ellipse shape, a polygon shape, or the like, which is not specifically limited in this application.

The exhaust mechanism 242 may be partially located in the first concave portion 2411, or certainly the exhaust mechanism 242 may alternatively be entirely located in the first concave portion 2411. When the exhaust mechanism 242 is entirely located in the first concave portion 2411, in the axial direction X of the first through hole 2421a, a side of the exhaust mechanism 242 far away from the bottom wall of the first concave portion 2411 may be flush with the exhaust body 241.

The first concave portion 2411 is provided on the exhaust body 241, and the exhaust mechanism 242 is accommodated at least partially in the first concave portion 2411, which can reduce the occupied space of the entire exhaust apparatus 24, and such arrangement of the first concave portion 2411 can enable positioning of the exhaust mechanism 242 for installation and reduce assembly difficulty between the exhaust mechanism 242 and the exhaust body 241.

In some embodiments, the connection member 2421 includes a body region 24211 and an exhaust region 24212. The body region 24211 is configured to connect the exhaust body 241, the exhaust region 24212 includes the connection portion 2421b and the plurality of first through holes 2421a, one part of the ventilation member 2422 is attached to the body region 24211, and the other part of the ventilation member 2422 is attached to the connection portion 2421b of the exhaust region 24212. The exhaust body 241 is provided with a shielding portion 2412 and a second through hole 2413 at the bottom of the first concave portion 2411. The shielding portion 2412 is configured to shield at least part of the exhaust region 24212, and the second through hole 2413 is configured to communicate with space defined by the first concave portion 2411.

The body region 24211 and the exhaust region 24212 of the connection member 2421 may be of an integrated structure, or certainly may be of a split structure, and optionally they are of an integrated structure, which can ensure the connection strength between the two and facilitate the forming of the connection member 2421.

The body region 24211 of the connection member 2421 may be disposed around the exhaust region 24212, and the outer circumference of the body region 24211 may be connected to the exhaust body 241, or optionally may be fixedly connected to the exhaust body 241 by welding or the like.

The plurality of first through holes 2421a and the connection portion 2421b are all provided in the exhaust region 24212, and the ventilation member 2422 is attached to both the connection portion 2421b of the exhaust region 24212 and the body region 24211.

The first concave portion 2411 includes a bottom and side walls, and the side walls are arranged around the bottom. The shielding portion 2412 is located at the bottom of the first concave portion 2411, and the second through hole 2413 may run through the bottom of the first concave portion 2411 in the axial direction X of the first through hole 2421a.

The number of the second through holes 2413 may be one or more, and a bore diameter of the second through hole 2413 may be equal to or not equal to the bore diameter of the first through hole 2421a. Optionally, the bore diameter of the second through hole 2413 may be larger than that of any one of the first through holes 2421a.

In the axial direction X of the first through hole 2421a, the second through hole 2413 and the first through hole 2421a may be opposite, or certainly in some embodiments, may be staggered in the axial direction X of the first through hole 2421a.

By defining that the connection member 2421 includes the body region 24211 and the exhaust region 24212, the connection member 2421 can be connected to the exhaust body 241 through the body region 24211 to ensure the connection strength between the connection member 2421 and the exhaust body 241. The gas inside the battery cell 20 can be exhausted through the exhaust region 24212 to ensure safety performance of the battery cell 20. Because one part of the ventilation member 2422 is attached to the body region 24211 and the other part of the ventilation member 2422 is attached to the exhaust region 24212, to be specific, the ventilation member 2422 is attached not only to the connection portion 2421b but also to the body region 24211, the attachment strength between the ventilation member 2422 and the connection member 2421 can be ensured, and the risk of separation of the ventilation member 2422 from the connection member 2421 can be reduced. The shielding portion 2412 is configured to shield at least part of the exhaust region 24212, and the shielding portion 2412 can prevent at least part of impurities from entering the plurality of first through holes 2421a, thereby avoiding influence on the ventilation member 2422 and ensuring performance of the ventilation member 2422. The second through hole 2413 is configured to communicate with the space defined by the first concave portion 2411, so that the gas inside the battery cell 20 can be exhausted, so as to ensure safety performance of the battery cell 20.

In some embodiments, the shielding portion 2412 is provided with a second concave portion 2414, where the second concave portion 2414 is recessed from the bottom of the first concave portion 2411 in a direction leaving away from the ventilation member 2422, and an avoidance space 2415 is formed between the bottom of the second concave portion 2414 and the exhaust mechanism 242 to avoid the exhaust region 24212.

The orthographic projection of the second concave portion 2414 in the axial direction X of the first through hole 2421a may be in various shapes such as circle, ellipse, or polygon. Optionally, in the axial direction X of the first through hole 2421a, the area of the orthographic projection of the second concave portion 2414 is smaller than an area of an orthographic projection of the first concave portion 2411. Optionally, the orthographic projection of the second concave portion 2414 is located inside the orthographic projection of the first concave portion 2411.

The second through hole 2413 may extend from the bottom of the second concave portion 2414 in the axial direction X of the first through hole 2421a and penetrate through the exhaust body 241. In the axial direction X of the first through hole 2421a, the bottom of the second concave portion 2414 is spaced apart from the exhaust mechanism 242 to form the avoidance space 2415.

The shielding portion 2412 is provided with the second concave portion 2414, and the avoidance space 2415 is formed between the bottom of the second concave portion 2414 and the exhaust mechanism 242, so that in the axial direction of the first through hole 2421a, when the orthographic projections of at least part of the first through holes 2421a are covered by the shielding portion 2412, the shielding portion 2412 can be prevented from contacting the exhaust region 24212 of the connection member 2421, thereby preventing the shielding portion 2412 from closing the first through holes 2421a covered by the shielding portion 2412, ensuring the internal gas exhaust requirements of the battery cell 20 and enhancing safety performance of the battery cell 20.

Figure 8:
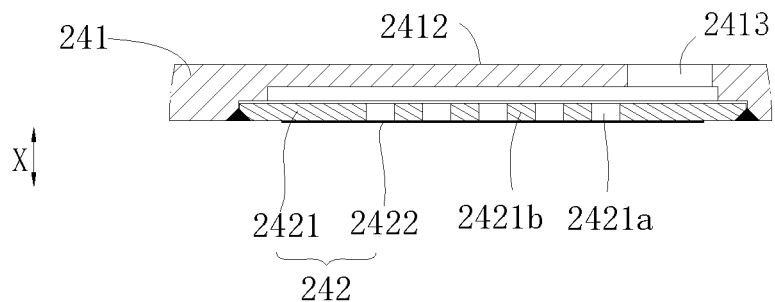
FIG. 8 is a cross-sectional view of an exhaust apparatus according to some other embodiments of this application.

Referring to FIG. 8, FIG. 8 is a cross-sectional structural view of the exhaust apparatus 24 according to some other embodiments of this application. In some embodiments, in the axial direction X of the first through hole 2421a, the shielding portion 2412 completely shields the exhaust region 24212, and the second through hole 2413 is completely staggered from the exhaust region 24212.

To be specific, in the axial direction X of the first through hole 2421a, the orthographic projection of the shielding portion 2412 completely covers the orthographic projection of the exhaust region 24212, and the orthographic projection of the second through hole 2413 is completely staggered from the orthographic projection of the exhaust region 24212.

The foregoing arrangement can not only ensure the internal gas exhaust requirements of the battery cell 20 but also effectively protect the connection member 2421 and ventilation member 2422 through the shielding portion 2412, decreasing a probability that the ventilation member 2422 is damaged or corroded by external impurities or internal electrolyte.

Still referring to FIG. 4 to FIG. 8, in some embodiments, the first concave portion 2411 is recessed from the inner surface of the exhaust body 241 in the direction leaving away from the inside of the battery cell 20, the shielding portion 2412 is located on the side of the exhaust mechanism 242 far away from the inside of the battery cell 20, and the second through hole 2413 is configured to communicate an exterior space of the battery cell 20 with the first concave portion 2411.

The first concave portion 2411 may be formed by recessing the inner surface of the exhaust body 241 to the outside of the battery cell 20, and the first concave portion 2411 may be recessed in the axial direction X of the first through hole 2421a. In the axial direction X of the first through hole 2421a, the exhaust mechanism 242 is located between the shielding portion 2412 and the electrode assembly 22. When the orthographic projection of the shielding portion 2412 in the axial direction X of the first through hole 2421a covers at least part of the first through holes 2421a, the second concave portion 2414 is provided on the shielding portion 2412. In this example, the second concave portion 2414 may be recessed from the bottom of the first concave portion 2411 in the axial direction X leaving away from the ventilation member 2422, and the exhaust mechanism 242 is located between the second through hole 2413 and the electrode assembly 22.

In the foregoing technical solution, the first concave portion 2411 is recessed from the inner surface of the exhaust body 241 in the direction leaving away from the inside of the battery cell 20, the shielding portion 2412 is located on the side of the exhaust mechanism 242 far away from the inside of the battery cell 20, and the second through hole 2413 is configured to communicate the exterior space of the battery cell 20 with the first concave portion 2411, so that the gas inside the battery cell 20 can flow through the second through hole 2413 and the first through holes 2421a in sequence and be exhausted through the ventilation mechanism. The position of the shielding portion 2412 can effectively prevent external impurities from entering the first through holes 2421a, thereby reducing the risk of damage to the ventilation member 2422.

Figure 9:
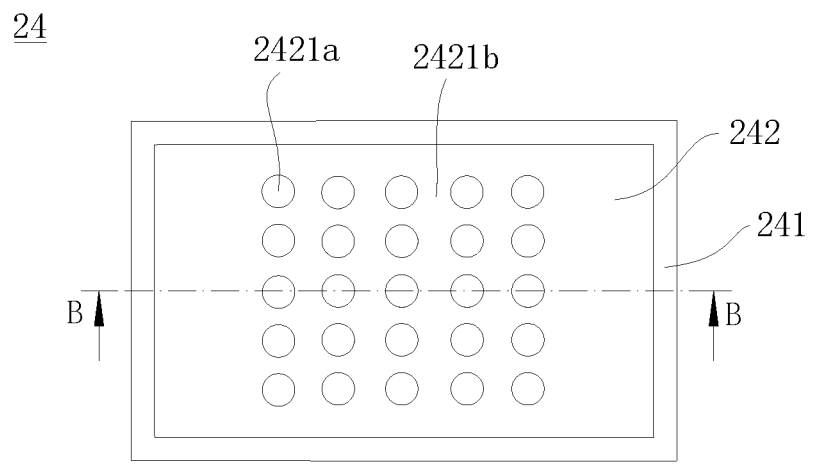
FIG. 9 is a top view of an exhaust apparatus according to some other embodiments of this application.
Figure 10:
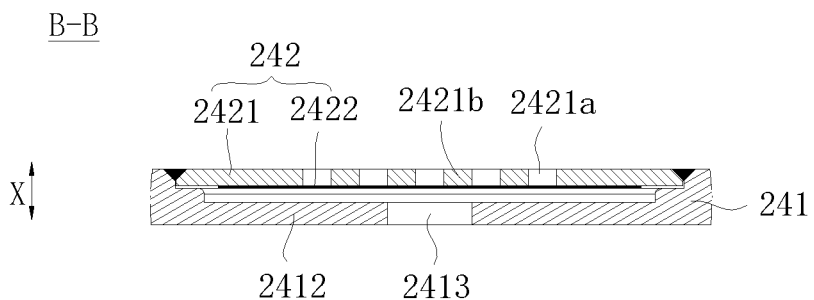
FIG. 10 is a cross-sectional view along direction B-B in FIG. 9.
Figure 11:
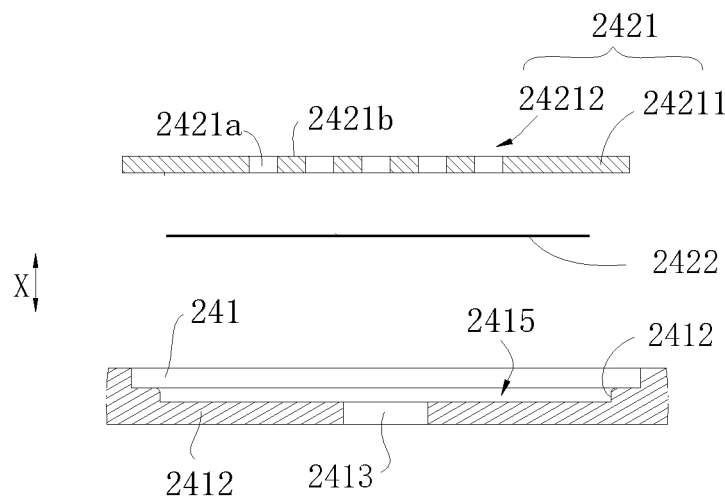
FIG. 11 is an exploded view of an exhaust apparatus according to some other embodiments of this application.

Referring to FIG. 9 to FIG. 11, FIG. 9 is a top view of an exhaust apparatus 24 according to some other embodiments of this application, FIG. 10 is a cross-sectional view along direction B-B in FIG. 9, and FIG. 11 is an exploded view of an exhaust apparatus 24 according to some other embodiments of this application.

In some embodiments, the first concave portion 2411 may alternatively be recessed from an outer surface of the exhaust body 241 in the direction approaching towards the inside of the battery cell 20, the shielding portion 2412 is located on the side of the exhaust mechanism 242 close to the inside of the battery cell 20, and the second through hole 2413 is configured to communicate an interior space of the battery cell 20 with the first concave portion 2411.

The first concave portion 2411 may be recessed from the outer surface of the exhaust body 241 toward the inside of the battery cell 20 in the axial direction X of the first through hole 2421a. When the orthographic projection of the shielding portion 2412 in the axial direction X of the first through hole 2421a covers at least part of the first through holes 2421a, the second concave portion 2414 is provided on the shielding portion 2412. In this example, the second concave portion 2414 may be recessed from the bottom of the first concave portion 2411 in the axial direction X approaching towards the ventilation member 2422, and the second through hole 2413 is located between the exhaust mechanism 242 and the electrode assembly 22.

In the foregoing technical solution, the gas generated by the battery cell 20 first flows through the second through holes 2413, then flows through the ventilation member 2422, and then is exhausted through the plurality of first through holes 2421a. The first concave portion 2411 can support and protect the ventilation member 2422 to facilitate installation and positioning of the ventilation member 2422 in 2511 of the first concave portion 2411.

Figure 12:
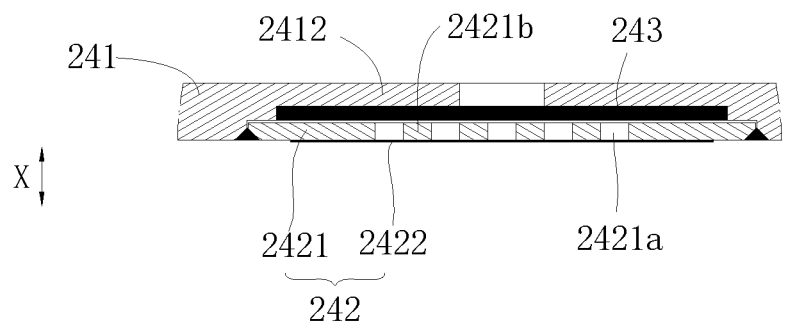
FIG. 12 is a cross-sectional view of an exhaust apparatus according to still some other embodiments of this application.
Figure 13:
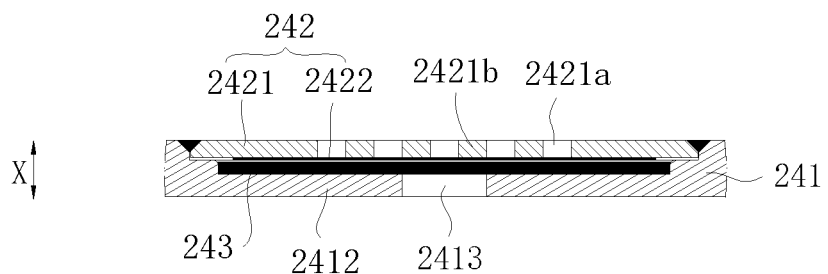
FIG. 13 is a cross-sectional view of an exhaust apparatus according to yet some other embodiments of this application.

Referring to FIG. 12 and FIG. 13, FIG. 12 is a cross-sectional of an exhaust apparatus 24 according to still some other embodiments of this application, and FIG. 13 is an exploded view of an exhaust apparatus 24 according to yet some other embodiments of this application.

In some embodiments, the exhaust apparatus 24 further includes a ventilation limiting member 243, where the ventilation limiting member 243 is at least partially located in the second concave portion 2414 and is configured to limit deformation of the exhaust region 24212.

The ventilation limiting member 243 has a ventilation function. Optionally, the ventilation limiting member 243 may be partially located in the second concave portion 2414, or certainly may be entirely located in the second concave portion 2414. In the axial direction X of the first through hole 2421a, the ventilation limiting member 243 may be held between the shielding portion 2412 and the exhaust mechanism 242, thereby providing an anchorage force for the exhaust mechanism 242 and limiting deformation of the exhaust region 24212, specifically, limiting deformation of the exhaust region 24212 in the axial direction X of the first through hole 2421a.

Optionally, the ventilation limiting member 243 may be a film layer structure with a predetermined thickness, and optionally, the ventilation limiting member 243 may also have a waterproof function.

Optionally, the ventilation limiting member 243 may be in contact with but not connected to the exhaust mechanism 242 and the shielding portion 2412, or certainly the ventilation limiting member 243 may alternatively be in contact with and connected to the exhaust mechanism 242, or the ventilation limiting member 243 may alternatively be in contact with and connected to both the exhaust mechanism 242 and the shielding portion 2412.

The exhaust apparatus 24 further includes the ventilation limiting member 243, and the ventilation limiting member 243 is at least partially located in the second concave portion 2414, which can provide support for the exhaust mechanism 242 through the ventilation limiting member 243 to limit deformation of the exhaust region 24212, thereby decreasing a probability of deformation of the ventilation member 2422 and improving safety performance of the exhaust apparatus 24.

In some embodiments, the ventilation limiting member 243 is attached to the exhaust region 24212 and supported on the exhaust region 24212.

The ventilation limiting member 243 is attached to the exhaust region 24212, which can cover the first through holes 2421a of the exhaust region 24212 and abut against the connection portion 2421b. The ventilation limiting member 243 and the exhaust region 24212 may be directly connected to each other by means of bonding, chemical bonding, or the like.

The foregoing arrangement can enhance air pressure resistance of the exhaust region 24212, decrease a probability of deformation of the exhaust region 24212, and further decrease a probability of deformation of a region to which the ventilation member 2422 is attached.

In some embodiments, in the axial direction X of the first through hole 2421a, the ventilation limiting member 243 may cover the plurality of first through holes 2421a and the connection portion 2421b.

The foregoing arrangement can not only limit deformation of the exhaust region 24212, but also can provide protection for the side of the ventilation member 2422 in the axial direction X, so as to prevent external impurities or internal electrolyte from acting on the ventilation member 2422 and causing damage to the ventilation member 2422, thereby ensuring safety performance of the exhaust mechanism 242

In some embodiments, the ventilation member 2422 and the connection member 2421 are integrally connected by chemical bonding.

A chemical bond is a general term for a strong interaction force between two or more adjacent atoms (or ions) in a pure substance molecule or a crystal. An action force that binds ions or atoms together is known as a chemical bond.

The ventilation member 2422 and the connection member 2421 are integrally connected by chemical bonding, which makes connection between the ventilation member 2422 and the connection member 2421 more secure, ensures the connection strength of the two, minimizes influence on the performance of the ventilation member 2422, and can guarantee the performance of the ventilation member 2422.

Figure 14:
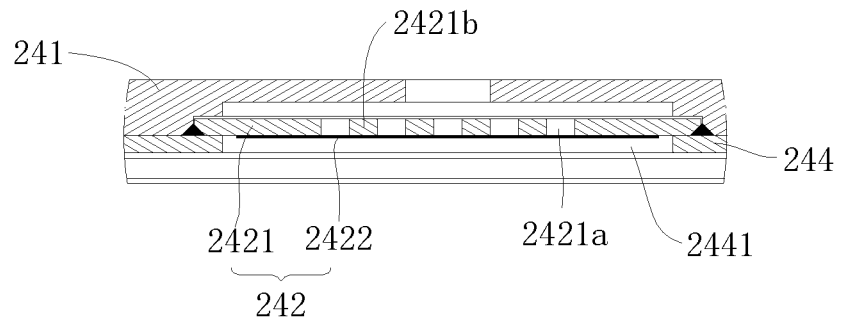
FIG. 14 is a cross-sectional view of an exhaust apparatus according to still some other embodiments of this application.
Figure 15:
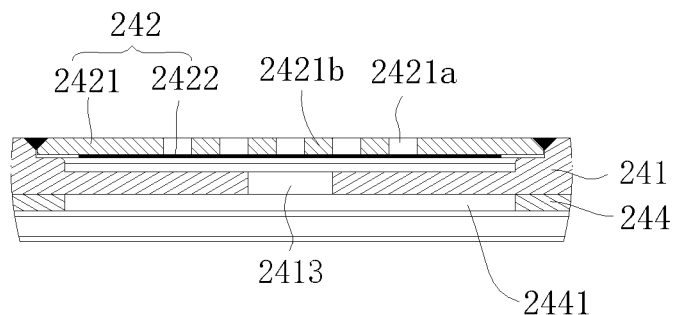
FIG. 15 is a cross-sectional view of an exhaust apparatus according to yet some other embodiments of this application.

Referring to FIG. 14 and FIG. 15, FIG. 14 is a cross-sectional of an exhaust apparatus 24 according to still some other embodiments of this application, and FIG. 15 is an exploded view of an exhaust apparatus 24 according to yet some other embodiments of this application.

In some embodiments, the exhaust apparatus 24 further includes an insulating member 244, where the insulating member 244 is located on a side of the exhaust body 241 close to the inside of the battery cell 20, the insulating member 244 is provided with a third through hole 2441, and the third through hole 2441 is configured to communicate the interior space of the battery cell 20 with the first through holes 2421a.

The insulating member 244 is a component that separates the end cover 23 from the electrode assembly 22, and the insulating member 244 implements insulative isolation between the end cover 23 and the electrode assembly 22. The insulating member 244 is made of an insulating material, and the insulating member 244 may be made of an insulating material such as plastic and rubber. For example, the insulating member 244 is provided between the end cover 23 and the electrode assembly 22. It can be understood that if there are a plurality of electrode assemblies 22, the insulating member 244 covers all of the plurality of electrode assemblies 22.

The insulating member 244 may be a plate. In the axial direction X of the first through hole 2421a, the third through hole 2441 may be arranged corresponding to or not corresponding to the first through hole 2421a, and a bore diameter of the third through hole 2441 may be equal to or not equal to that of the first through hole 2421a.

Provision of the insulating member 244 can avoid short circuit caused by contact between the electrode assembly 22 and the end cover 23 metal, and the third through hole 2441 provided on the insulating member 244 can communicate the interior space of the battery cell 20 with the first through holes 2421a, ensuring the internal gas exhaust requirements of the battery cell 20.

Figure 16:
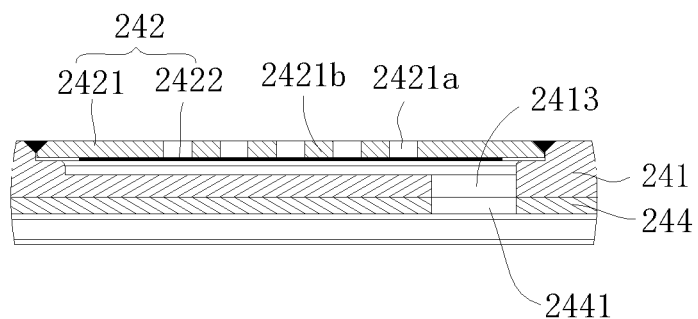
FIG. 16 is a cross-sectional view of an exhaust apparatus according to still some other embodiments of this application.

Referring to FIG. 16, FIG. 16 is a cross-sectional view of an exhaust apparatus 24 according to still some other embodiments of this application. In some embodiments, in the axial direction of the first through hole 2421a, the third through hole 2441 is completely staggered from the first through hole 2421a. In the axial direction X of the first through hole 2421a, the third through hole 2441 and the first through hole 2421a do not overlap.

The foregoing arrangement can block liquid or impurity particles, thereby ensuring the performance of the ventilation member 2422. In addition, the foregoing arrangement can also prevent the gas inside the battery cell 20 from directly acting on the first through holes 2421a via the third through hole 2441, reducing the impact force on the first through holes 2421a, decreasing a probability of deformation of the ventilation member 2422, and further ensuring safety performance of the battery cell 20.

Figure 17:
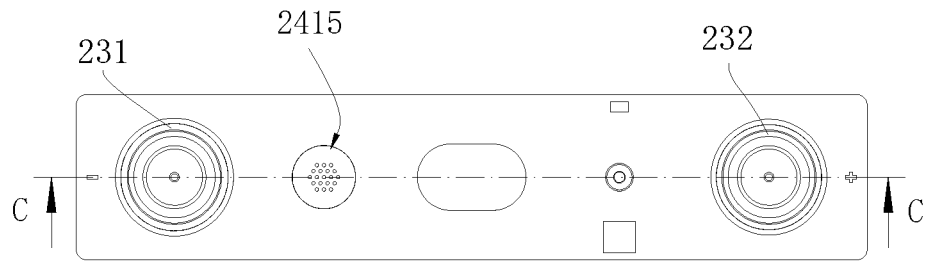
FIG. 17 is a top view of an exhaust apparatus according to still some other embodiments of this application.
Figure 18:
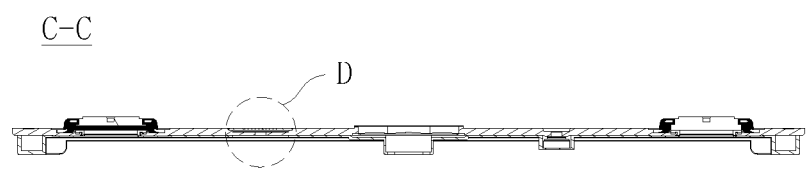
FIG. 18 is a cross-sectional view along direction C-C in FIG. 17.
Figure 19:
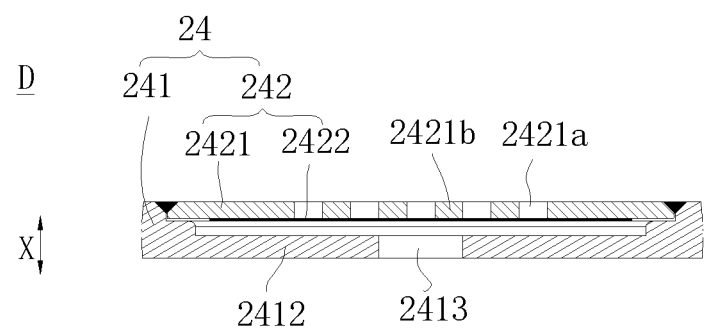
FIG. 19 is an enlarged view of position D in FIG. 18.

Referring to FIG. 17 to FIG. 19, FIG. 17 is a top view of an exhaust apparatus 24 according to still some other embodiments of this application, FIG. 18 is a cross-sectional view along direction C-C in FIG. 17, and FIG. 19 is an exploded view of position D shown in FIG. 18.

In some embodiments, the exhaust body 241 is the end cover 23 of the battery cell 20. To be specific, the exhaust apparatus 24 may be provided at a position of the end cover 23 of the battery cell 20.

The foregoing arrangement can enable the end cover 23 of the battery cell 20 to be integrated with an exhaust function, which can ensure safety performance of the battery cell 20.

It can be understood that, the foregoing embodiments are all illustrated by using the exhaust body 241 as the end cover 23 of the battery cell 20 as an example.

Figure 20:
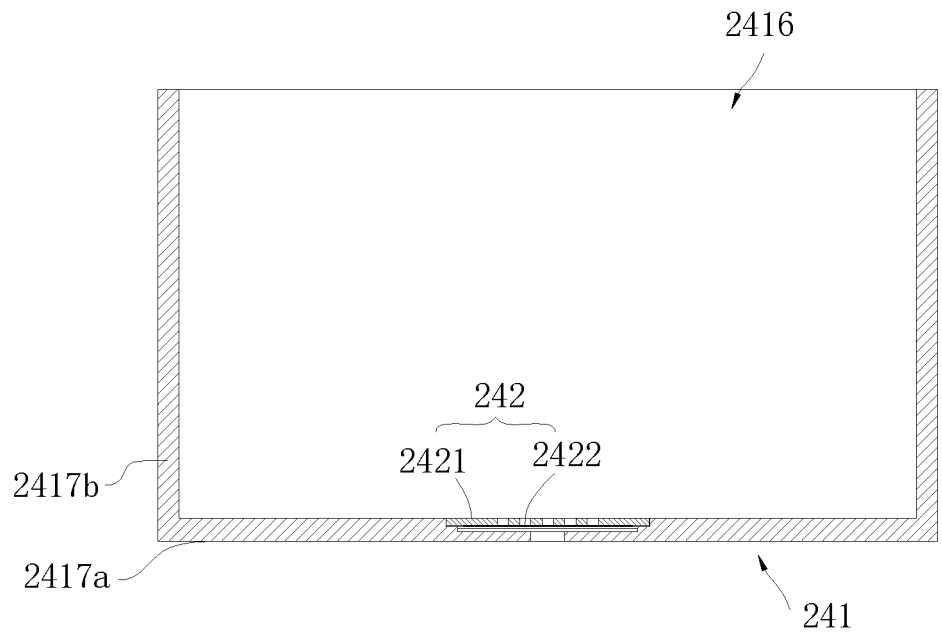
FIG. 20 is a cross-sectional view of an exhaust apparatus according to yet some other embodiments of this application.

Referring to FIG. 20, FIG. 20 is a cross-sectional view of an exhaust apparatus 24 according to yet some other embodiments of this application. In some other embodiments, the exhaust body 241 may also be internally formed with an accommodating chamber 2416, the exhaust body 241 has a plurality of walls defining the accommodating chamber 2416, and the exhaust mechanism 242 is provided on at least one of the walls.

At least one of the walls of the exhaust body 241 is provided with an exhaust structure, and only one of the walls may be provided with an exhaust structure, or some of the walls each may be provided with an exhaust structure. The exhaust structure may be provided on an outer surface of the wall, or may be provided on an inner surface of the wall.

The exhaust body 241 may be in various shapes such as a cuboid and a cylinder. The exhaust body 241 being in a cuboid shape is used as an example. The exhaust body 241 may have five walls, one bottom wall 2417a and four side walls 2417b enclose together to form the accommodating chamber 2416 with an opening formed at an end, and an exhaust structure is provided on the bottom wall 2417a. The exhaust body 241 being in a cylinder shape is used as an example. The exhaust body 241 may have two walls, one bottom wall 2417a and one peripheral wall. A peripheral wall encloses an edge of the bottom wall 2417a, and the peripheral wall and the bottom wall 2417a enclose together to form the accommodating chamber 2416 with an opening formed at an end, and the exhaust body 241 is provided on the bottom wall 2417a.

In this embodiment, because the accommodating chamber 2416 for accommodating the electrode assembly 22 is formed inside the exhaust body 241, and the plurality of walls of the exhaust body 241 define the accommodating chamber 2416, so that the exhaust apparatus 24 is the housing 21 capable of accommodating the electrode assembly 22, and the exhaust apparatus 24 integrate both accommodating function and pressure relief function.

An embodiment of this application provides a battery cell 20, including the exhaust apparatus 24 according to any one of the foregoing embodiments.

An embodiment of this application provides a battery, including a box and the battery cell 20 according to any one of the foregoing embodiments, where the box is configured to accommodate the battery cell 20.

An embodiment of this application provides an electric apparatus, including the battery according to any one of the foregoing embodiments, where the battery is configured to supply electric energy.

Figure 21:
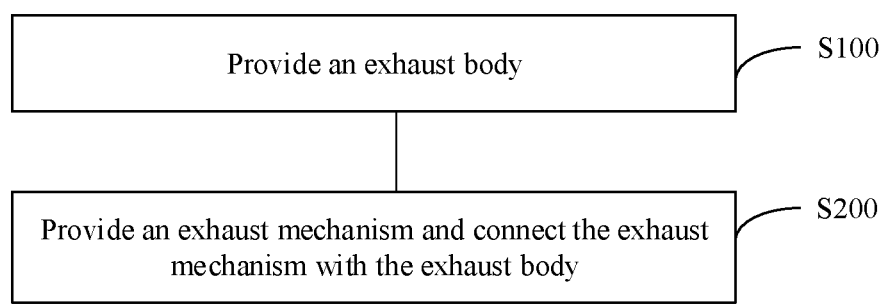
FIG. 21 is a flowchart of a manufacturing method of exhaust apparatus according to some embodiments of this application.

Referring to FIG. 21, FIG. 21 is a flowchart of a manufacturing method of exhaust apparatus 24 according to some embodiments of this application. An embodiment of this application provides a manufacturing method of exhaust apparatus 24, where the method includes the following steps.

S100: Provide an exhaust body 241.

S200: Provide an exhaust mechanism 242 and connect the exhaust mechanism 242 and the exhaust body 241.

The exhaust mechanism 242 includes a connection member 2421 and a ventilation member 2422. The connection member 2421 is configured to connect the exhaust body 241, and the connection member 2421 is provided with a plurality of first through holes 2421a. The ventilation member 2422 covers the plurality of first through holes 2421a, and the ventilation member 2422 is configured to, when a pressure of gas inside the battery cell 20 reaches a first threshold, exhaust the gas to the outside of the battery cell 20 through the plurality of first through holes 2421a. The connection member 2421 includes a connection portion 2421b formed between two adjacent ones of the first through holes 2421a, and the connection portion 2421b is configured to attach to the ventilation member 2422 to limit deformation of the ventilation member 2422.

The manufacturing method of exhaust apparatus 24 provided in this embodiment of this application can be used for molding the exhaust apparatus 24 provided in the foregoing embodiments. In the exhaust apparatus 24 manufactured by using this method, the connection member 2421 includes the connection portion 2421b formed between two adjacent ones of the first through holes 2421a, and therefore it can be attached to the ventilation member 2422 through the connection portion 2421b. When the gas inside the battery cell 20 acts on the ventilation member 2422 in the process of exhaust to the outside of the battery cell 20 through the ventilation member 2422, the connection portion 2421b can provide the ventilation member 2422 with a counterforce against the pressure in the battery cell 20 to reduce deformation of the ventilation member 2422, improve the overall internal pressure resistance of the exhaust apparatus 24, and further enhance safety performance of the battery cell 20.

Figure 22:
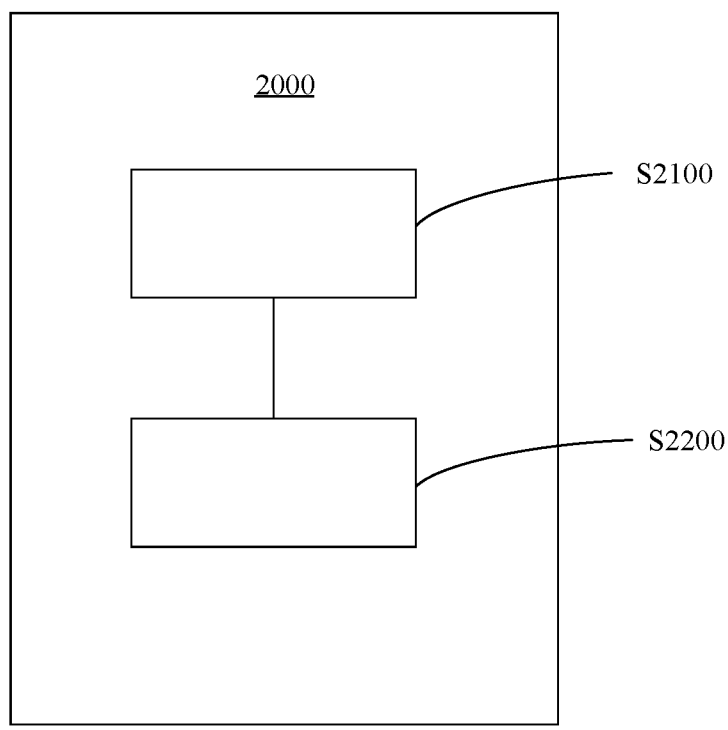
FIG. 22 is a schematic block diagram of a manufacturing device of exhaust apparatus according to some embodiments of this application.

Referring to FIG. 22, FIG. 22 is a schematic block diagram of a manufacturing device of exhaust apparatus 24 according to some embodiments of this application. An embodiment of this application provides a manufacturing device of exhaust apparatus 24, where the device includes a providing apparatus 2100 and an assembly apparatus 2200. The providing apparatus 2100 is configured to provide an exhaust body 241; and the assembly apparatus 2200 is configured to provide an exhaust mechanism 242, and connect the exhaust mechanism 242 to the exhaust body 241, where the exhaust mechanism 242 includes a connection member 2421 and a ventilation member 2422, the connection member 2421 is configured to connect the exhaust body 241, the connection member 2421 is provided with a plurality of first through holes 2421a, the ventilation member 2422 covers the plurality of first through holes 2421a, and the ventilation member 2422 is configured to, when a pressure of gas inside the battery cell 20 reaches a first threshold, exhaust the gas to the outside of the battery cell 20 through the plurality of first through holes 2421a; and the connection member 2421 includes a connection portion 2421b formed between two adjacent ones of the first through holes 2421a, and the connection portion 2421b is configured to attach to the ventilation member 2422 to limit deformation of the ventilation member 2422.

The manufacturing device of exhaust apparatus 24 provided in this embodiment of this application can be configured to manufacture the exhaust apparatus 24 provided in the foregoing embodiments. In the exhaust apparatus 24 manufactured by using this method, the connection member 2421 includes the connection portion 2421b formed between two adjacent ones of the first through holes 2421a, and therefore it can be attached to the ventilation member 2422 through the connection portion 2421b. When the gas inside the battery cell 20 acts on the ventilation member 2422 in the process of exhaust to the outside of the battery cell 20 through the ventilation member 2422, the connection portion 2421b can provide the ventilation member 2422 with a counterforce against the pressure in the battery cell 20 to reduce deformation of the ventilation member 2422, improve the overall internal pressure resistance of the exhaust apparatus 24, and further enhance safety performance of the battery cell 20.

It should be noted that, in absence of conflicts, the embodiments and features in the embodiments in this application may be mutually combined.

The foregoing embodiments are only intended to illustrate the technical solutions of this application which are not intended to limit this application. Persons skilled in the art understand that this application may have various modifications and variations. Any modifications, equivalent replacements, and improvements made without departing from the spirit and principle of this application shall fall within the protection scope of this application.

The invention claimed is:

1. An exhaust apparatus applied to a battery cell, wherein the exhaust apparatus comprises:
   an exhaust body; and
   an exhaust mechanism provided on the exhaust body, wherein the exhaust mechanism comprises a connection member and a ventilation member, the connection member is configured to connect the exhaust body, wherein the connection member is provided with a plurality of first through holes, the ventilation member covers the plurality of first through holes, and the ventilation member is configured to, when a pressure of gas inside the battery cell reaches a first threshold, exhaust the gas to an outside of the battery cell through the plurality of first through holes; and
   the connection member comprises a connection portion formed between two adjacent ones of the first through holes, and the connection portion is configured to attach to the ventilation member to limit deformation of the ventilation member;
   wherein the plurality of first through holes are spaced apart from each other, and a minimum distance D between two adjacent ones of the first through holes and a thickness L of the ventilation member in an axial direction of the first through hole satisfy $1.2 \leq D/L \leq 5$.

2. The exhaust apparatus according to claim 1, wherein the ventilation member is provided on a side of the connection member close to an inside of the battery cell, and the connection portion is configured to provide an anchorage force for the ventilation member when the ventilation member deforms towards an outside of the battery cell.

3. The exhaust apparatus according to claim 1, wherein the plurality of first through holes have same shape and equal area.

4. The exhaust apparatus according to claim 1, wherein the first through hole is in one of a circular shape, an ellipse shape, a kidney shape, and a polygon shape.

5. The exhaust apparatus according to claim 1, wherein the first through hole is circular, and a bore diameter d of the first through hole and a minimum distance D between two adjacent ones of the first through holes satisfy $0.1 \leq d/D \leq 4$.

6. The exhaust apparatus according to claim 4, wherein the minimum distance D between two adjacent ones of the first through holes satisfies $D \geq 0.5$ mm.

7. The exhaust apparatus according to claim 1, wherein in the axial direction of the first through hole, a sum S1 of orthographic projection areas of all of the first through holes and an orthographic projection area S2 of the ventilation member satisfy $S1/S2 \leq 0.8$.

8. The exhaust apparatus according to claim 1, wherein the exhaust body and the exhaust mechanism are provided separately, and the exhaust mechanism is connected to the exhaust body through the connection member.

9. The exhaust apparatus according to claim 8, wherein the exhaust body is provided with a first concave portion, and the first concave portion is configured to accommodate at least part of the exhaust mechanism.

10. The exhaust apparatus according to claim 9, wherein the connection member comprises a body region and an exhaust region, the body region is configured to connect the exhaust body, the exhaust region comprises the connection portion and the plurality of first through holes, one part of the ventilation member is attached to the body region, and the other part of the ventilation member is attached to the connection portion of the exhaust region; and the exhaust body is provided at a bottom of the first concave portion with a shielding portion and a second through hole, the shielding portion is configured to shield at least part of the exhaust region, and the second through hole is configured to communicate with a space defined by the first concave portion.

11. The exhaust apparatus according to claim 10, wherein the shielding portion completely shields the exhaust region in an axial direction of the first through hole, and the second through hole is completely staggered from the exhaust region.

12. The exhaust apparatus according to claim 10, wherein the shielding portion is provided with a second concave portion, the second concave portion is recessed from the bottom of the first concave portion in a direction leaving away from the ventilation member, and an avoidance space is formed between the bottom of the second concave portion and the exhaust mechanism to avoid the exhaust region;

preferably wherein the exhaust apparatus further comprises a ventilation limiting member, and the ventilation limiting member is at least partially located in the second concave portion and is configured to limit deformation of the exhaust region;

preferably wherein the ventilation limiting member is attached to the exhaust region and supported on the exhaust region.

13. The exhaust apparatus according to claim 10, wherein the first concave portion is recessed from an outer surface of the exhaust body in a direction approaching towards the inside of the battery cell, the shielding portion is located on a side of the exhaust mechanism close to the inside of the battery cell, and the second through hole is configured to communicate an interior space of the battery cell with the first concave portion.

14. The exhaust apparatus according to claim 10, wherein the first concave portion is recessed from an inner surface of the exhaust body in a direction leaving away from the inside of the battery cell, the shielding portion is located on a side of the exhaust mechanism far away from the inside of the battery cell, and the second through hole is configured to communicate an exterior space of the battery cell with the first concave portion.

15. The exhaust apparatus according to claim 1, wherein the ventilation member and the connection member are integrally connected by chemical bonding, and/or wherein the exhaust body is internally formed with an accommodating chamber, the exhaust body has a plurality of walls defining the accommodating chamber, and the exhaust mechanism is provided on at least one of the walls.

16. The exhaust apparatus according to claim 1, wherein the exhaust body is an end cover of the battery cell;

preferably wherein the exhaust apparatus further comprises an insulating member, the insulating member is located on a side of the exhaust body close to the inside of the battery cell, the insulating member is provided with a third through hole, and the third through hole is configured to communicate an interior space of the battery cell with the first through holes;

preferably wherein the third through hole is completely staggered from the first through hole in an axial direction of the first through hole.

17. A battery cell, comprising the exhaust apparatus according to claim 1.

18. A battery, comprising:
the battery cell according to claim 17; and
a box, configured to accommodate the battery cell.

19. An electric apparatus, comprising the battery according to claim 18, wherein the battery is configured to supply electric energy.

* * * * *